(12) United States Patent
Coppuck (10) Patent No.: US 10,315,700 B2
(45) Date of Patent: Jun. 11, 2019

(54) VEHICLE IMPACT STRUCTURES

(71) Applicant: Gordon Murray Design Limited, Shalford, Surrey (GB)

(72) Inventor: Frank Coppuck, Hook (GB)

(73) Assignee: GORDON MURRAY DESIGN LIMITED, Shalford (GB)

( * ) Notice: Subject to any disclaimer, the term of this patent is extended or adjusted under 35 U.S.C. 154(b) by 7 days.

(21) Appl. No.: 15/314,856

(22) PCT Filed: Jun. 9, 2015

(86) PCT No.: PCT/EP2015/062866
§ 371 (c)(1),
(2) Date: Nov. 29, 2016

(87) PCT Pub. No.: WO2015/189226
PCT Pub. Date: Dec. 17, 2015

(65) Prior Publication Data
US 2017/0197660 A1 Jul. 13, 2017

(30) Foreign Application Priority Data

Jun. 9, 2014 (GB) .................................. 1410154.7
Jun. 23, 2014 (GB) .................................. 1411102.5

(51) Int. Cl.
*B62D 21/15* (2006.01)
*B62D 23/00* (2006.01)
*B60G 3/20* (2006.01)

(52) U.S. Cl.
CPC ............ *B62D 21/152* (2013.01); *B60G 3/20* (2013.01); *B62D 23/005* (2013.01); *B60G 2200/156* (2013.01); *B60G 2206/016* (2013.01)

(58) Field of Classification Search
CPC ..... B62D 21/15; B62D 21/152; B62D 21/155
See application file for complete search history.

(56) References Cited

U.S. PATENT DOCUMENTS 4,951,964 A * 8/1990 Sakamoto ............ B62D 21/152
180/291
6,511,119 B2 * 1/2003 Takase ................. B62D 21/152
280/784
(Continued)

FOREIGN PATENT DOCUMENTS

DE  102010014749 A1 * 11/2010 ........... B62D 21/152
DE  102012004682 A1 *  9/2013 ........... B62D 21/152
(Continued)

OTHER PUBLICATIONS

Search Report and Written Opinion of the International Searching Authority for PCT/EP2015/062866, dated Sep. 15, 2015.

*Primary Examiner* — Nicole T Verley
(74) *Attorney, Agent, or Firm* — Westman, Champlin & Koehler, P.A.; Z. Peter Sawicki; Amanda M. Prose (57) ABSTRACT

The provision of impact structures is difficult in the case of small vehicles, due to the shortage of working depth. We propose to use the wheel and tire as part of the deformable structures, which reduces the overall weight of the vehicle and requires little or no additional space in which to provide the impact structures. There is still a need to control the movement of the wheel under impact, but we have found that this can be done by appropriate design of the suspension components so that they react in a defined manner to an impact and guide the wheel in the correct manner. The present invention therefore provides a vehicle comprising a chassis, at least one wheel, and a hub carrier on which the wheel is mounted, together with a suspension connecting the hub carrier to the chassis that includes a plurality of first links extending towards the chassis in at least one of an inward or an upward direction and at least one second link extending towards the chassis in a longitudinal direction, and a crushable structure attached to the chassis at a location (Continued)

aligned with a path of the wheel under impact after collapse of the longitudinally extending link.

20 Claims, 6 Drawing Sheets

(56) References Cited

U.S. PATENT DOCUMENTS

| | | | | |
|---|---|---|---|---|
| 6,572,162 B2* | 6/2003 | Belloso | | B62D 39/00 |
| | | | | 293/132 |
| 6,866,115 B2* | 3/2005 | Miyasaka | | B60R 19/00 |
| | | | | 180/311 |
| 7,441,829 B2* | 10/2008 | Baumann | | B62D 21/152 |
| | | | | 296/187.03 |
| 7,594,559 B2* | 9/2009 | Kitoh | | B62D 21/155 |
| | | | | 180/232 |
| 8,388,041 B2* | 3/2013 | Sakita | | B62D 21/152 |
| | | | | 296/187.11 |
| 8,393,669 B2* | 3/2013 | Ajisaka | | B62D 21/152 |
| | | | | 296/187.09 |
| 8,573,647 B2* | 11/2013 | Enning | | B60K 1/04 |
| | | | | 180/232 |
| 8,668,252 B2* | 3/2014 | Yasuhara | | B62D 21/11 |
| | | | | 296/187.08 |
| 8,807,632 B2* | 8/2014 | Ramoutar | | B60R 19/24 |
| | | | | 293/132 |
| 8,998,305 B2* | 4/2015 | Obata | | B62D 21/11 |
| | | | | 296/193.08 |
| 9,079,619 B2* | 7/2015 | Gupta | | B62D 21/152 |
| 9,085,329 B2* | 7/2015 | Komiya | | B62D 21/11 |
| 9,340,230 B2* | 5/2016 | Murray | | B62D 21/15 |
| 9,376,144 B2* | 6/2016 | Shaner | | B62D 25/082 |
| 9,399,487 B2* | 7/2016 | Fujita | | B62D 21/11 |
| 9,409,601 B2* | 8/2016 | Hoiss | | B62D 21/155 |
| 9,592,854 B2* | 3/2017 | Ishii | | B62D 21/155 |
| 9,623,911 B2* | 4/2017 | Kano | | B62D 21/11 |
| 9,694,853 B2* | 7/2017 | Craig | | B62D 21/155 |
| 9,738,320 B2* | 8/2017 | Miyamoto | | B62D 21/152 |
| 2014/0291053 A1* | 10/2014 | Nagasawa | | B62D 25/084 |
| | | | | 180/271 |
| 2015/0084322 A1* | 3/2015 | Killian | | B60B 21/026 |
| | | | | 280/784 |
| 2015/0329143 A1* | 11/2015 | Fujita | | B62D 21/11 |
| | | | | 280/784 |
| 2015/0329145 A1* | 11/2015 | Lauer | | B62D 25/025 |
| | | | | 280/784 |
| 2016/0159399 A1* | 6/2016 | Yasuhara | | B62D 25/082 |
| | | | | 180/292 |
| 2017/0036699 A1* | 2/2017 | Asai | | B62D 21/152 |
| 2017/0106821 A1* | 4/2017 | Gupta | | B62D 33/077 |
| 2017/0210424 A1* | 7/2017 | Makowski | | B62D 21/155 |
| 2017/0297519 A1* | 10/2017 | Canobbio | | B60R 19/00 |
| 2017/0305253 A1* | 10/2017 | Perlo | | B60K 1/04 |
| 2017/0355399 A1* | 12/2017 | Munjurulimana | | B62D 21/155 |
| 2018/0118271 A1* | 5/2018 | Kim | | B62D 21/152 |

FOREIGN PATENT DOCUMENTS

| | | | | |
|---|---|---|---|---|
| EP | 0978442 A1 * | 2/2000 | | B60R 19/00 |
| GB | 2482002 A | 1/2012 | | |
| GB | 2546593 A * | 7/2017 | | B62D 21/155 |
| WO | WO-2005118374 A1 * | 12/2005 | | B62D 21/155 |
| WO | 2009122178 A1 | 10/2009 | | |
| WO | 2010100412 A1 | 9/2010 | | |

* cited by examiner

VEHICLE IMPACT STRUCTURES

This application is a Section 371 National Stage Application of International Application No. PCT/EP2015/062866, filed Jun. 9, 2015, and published as WO2015/189226 on Dec. 17, 2015, which claims priority to and benefits of GB Patent Application Serial No. 1410154.7 filed Jun. 9, 2014, and GB Patent Application Serial No. 1411102.5, filed Jun. 23, 2014, the entire contents of which are incorporated herein by reference.

FIELD OF THE INVENTION

The present invention relates to impact structures (or crash structures) for vehicles.

BACKGROUND ART

Vehicle impact structures are designed to absorb the energy of an accident in which the vehicle is involved, dissipating the energy safely in a manner that decelerates the vehicle at a controlled rate. Typically, they will involve one or more sacrificial parts (which may also perform other functions during normal use of the vehicle) which crush or are otherwise deformed as a result of the impact. These parts are usually located to the front and to the rear of the vehicle, so that they receive the impact prior to it reaching the passenger cell.

SUMMARY OF THE INVENTION

The provision of such structures is difficult in the case of small vehicles such as urban city cars, typically styled to have very short front and rear overhangs to allow them to cope with urban mobility restrictions, parking and traffic flow considerations while retaining good handling qualities. There is, quite simply, insufficient space to provide these structures.

We propose to use the wheel and tyre as part of the deformable structures. Previously, there have been proposals for structures that catch or otherwise interact with the wheel and/or tyre, but this has been from the viewpoint of having to restrain the wheel from entering the passenger cell during impact. Examples include U.S. Pat. No. 6,364,358, WO2009/077079 and US2003/0141712, all of which add to the weight of the vehicle by including a structure that interacts with the wheel in order to direct its motion under impact. Such structures offer a benefit to the passenger in terms of a reduced likelihood of injury during an impact, but do so in a manner that calls for additional weight without contributing to the impact performance of the vehicle (other than preventing intrusion). By incorporating the wheels into the impact structure of the vehicle, we reduce the overall weight of the vehicle and require little or no additional space in which to provide the impact structures. There is still a need to control the movement of the wheel under impact, but we have found that this can be done by appropriate design of the suspension components so that they react in a defined manner to an impact and guide the wheel in the correct manner.

The present invention therefore provides a vehicle comprising a chassis, at least one wheel, and a hub carrier on which the wheel is mounted, together with a suspension connecting the hub carrier to the chassis that includes a plurality of first links extending towards the chassis in at least one of an inward or an upward direction and at least one second link extending towards the chassis in a longitudinal direction, and a crushable structure attached to the chassis at a location aligned with a path of the wheel under impact after collapse of the longitudinally extending link.

By integrating the design of the crushable structure into the suspension design in this way, the weight of the crushable structure can be minimised and rather than just controlling the movement of the wheel under impact in order to keep it from entering the passenger cell, the collapse of the wheel and suspension components can be employed as an active part of the energy absorption processes of the vehicle. This allows the front and rear sections of the vehicle to be optimised accordingly, allowing reductions in the weight and length of the vehicle as a whole while maintaining the necessary levels of impact resistance.

The chassis can be one that is made up of a framework of interconnected tubular members, preferably including planar composite panels bonded to the tubular members. The crushable structure can then be a tubular member forming part of the framework, ideally is substantially co-linear with at least part of a tubular member of the framework extending longitudinally along a majority of the length of the vehicle. Often, the framework will include a tubular member extending longitudinally with respect to the vehicle from a point ahead of the wheel to a point behind the wheel, formed with at least one bend ahead of the wheel to define a region ahead of the bend which is laterally aligned with the wheel and a region behind the bend which is located laterally inboard of the wheel, in which case the crushable structure is preferably connected to the tubular member substantially at the bend, and can be substantially co-linear with the region of the tubular member that is ahead of the bend.

The crushable structure can comprise a pair of tubular members, aligned vertically one above the other. These can be joined to the chassis at substantially the same location, from which they diverge, ideally at an acute angle to each other. The lower of the two tubular members forming the crushable structure is preferably substantially horizontal.

Crushable structures formed of at least one tubular member can include an end cap, ideally having a flat outer surface. In a variant of this idea, the end cap may be angled, being closer to the vehicle centreline at an edge closer to the wheel, and further from the centreline at an edge more remote from the wheel.

The chassis can also include a laterally-extending crossbar located behind a rearmost extent of the wheel, integrated into the framework where relevant. This will work with the other elements of the impact structure, absorbing lighter impacts without allowing the wheel and crushable structure to be involved and thus minimising the damage to the vehicle (and associated repair costs).

The end of the crushable structure proximate the wheel can have a convex profile substantially matching a concave outer radial profile of the hub, thus allowing the two to interengage or interlock under impact. The end of the crushable structure proximate the wheel can be adapted to pierce the tyre to assist with this.

The first links within the suspension can include an upwardly extending link in the form of a spring and damper unit. They can also include an inwardly extending link that comprises a wishbone attached to the hub carrier in two locations and attached to the chassis at one location. These two locations are ideally spaced horizontally. A suspension of this type is usually robust enough to provide reliable guidance to the wheel under impact while the second link collapses.

The wheel may be a front wheel of the vehicle, or a rear wheel of the vehicle. The invention will usually be applied on both sides of the vehicle, and may be applied to both the front and rear wheels.

BRIEF DESCRIPTION OF THE DRAWINGS

An embodiment of the present invention will now be described by way of example, with reference to the accompanying figures in which.

DETAILED DESCRIPTION OF THE EMBODIMENTS

Figure 1:
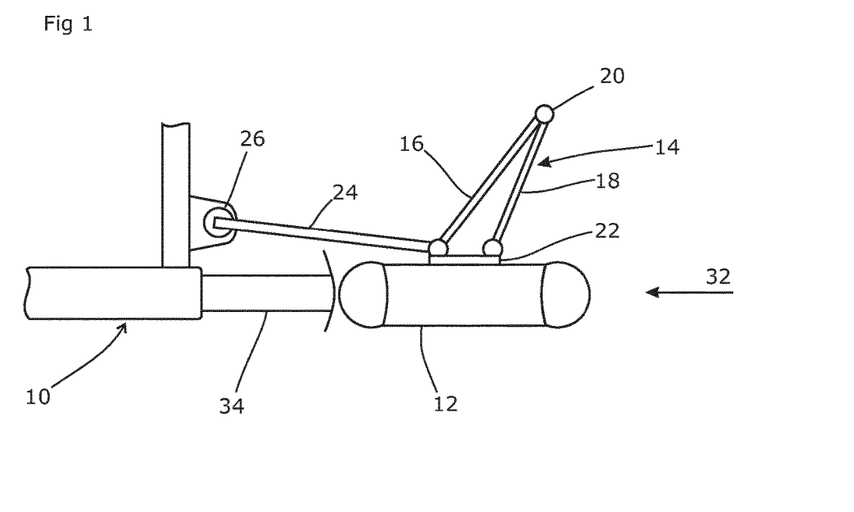
FIG. 1 shows a horizontal sectional view of a suspension and crush structure of a rear wheel of a vehicle according to the present invention.
Figure 2:
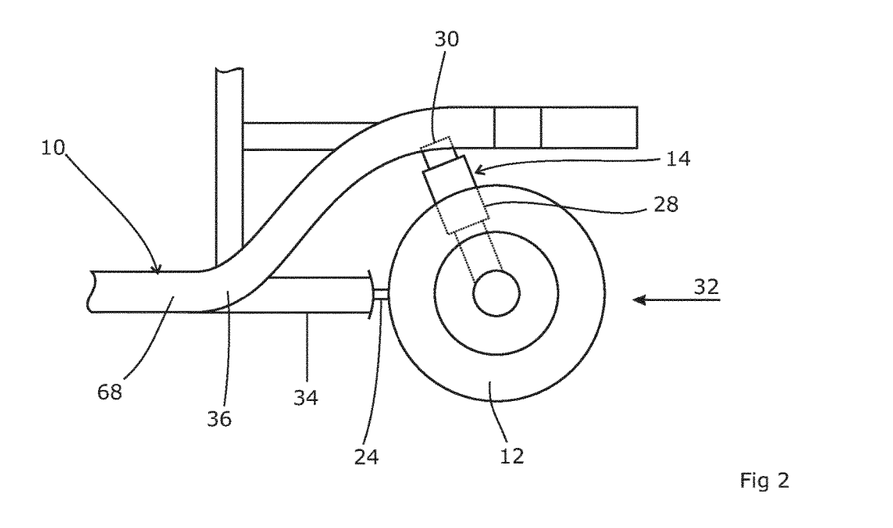
FIG. 2 shows a view from one side of the suspension and crush structure of FIG. 1.

FIGS. 1 and 2 show an embodiment of the invention in the form of a rear chassis and suspension. The chassis is in the form of a framework of tubular steel members, reinforced with composite panels in the manner disclosed in our application WO2009/122178 which is hereby incorporated by reference and to which the skilled reader is specifically directed for a fuller understanding of the present invention. Part of the chassis framework 10 is shown in FIGS. 1 and 2, and a rear wheel 12 of the vehicle is attached via a suspension arrangement 14. The suspension arrangement is largely as described in our earlier application WO2010/100412, with a pair of lateral arms 16, 18 extending away from a single hard mounting point 20 on the chassis 10 (not shown) and towards the hub carrier 22 for the wheel 12. A further control arm 24 extends rearwardly from a second hard mounting point 26 on the chassis 10 to the hub carrier 22, and a spring and damper unit 28 extends obliquely upwardly from the hub carrier to a hard mounting point 30 on the chassis framework 10. In combination, these suspension elements provide the car with good ride and handling capabilities using a minimum of space and parts.

The rear wheels 12 are most likely to be of influence during a collision from the rear, generally along the direction of arrow 32. Minor impacts of this type will be taken up by deformation of the rear bodywork and crush structures, but those above a certain threshold will reach the rear wheels and pass impact forces to them. Our analysis shows that this will likely cause the further control arm 24 to buckle and for the wheel to rotate around the suspension hard point 20 to which the lateral arms are attached. This will cause the wheel to move generally forwards, but along a trajectory that is predictable.

Existing "tyre catcher" structures are aimed at deflecting this movement of the wheel and tyre so that it does not impinge into the cabin and (potentially) cause injury to the driver and/or passengers. According to this example, however, a tyre-catching structure 34 is placed in the path of the wheel as determined by the suspension components in order to engage with the wheel 12 and interrupt its forward motion. The tyre-catcher 34 is attached to the chassis framework 10 and can therefore transmit forces directly into the chassis; it may also include crush structures such as a cylindrical tube of a circular or other cross-section. In this way, further collapse of the wheel and the tyre catcher 34 will contribute to the vehicle's energy absorption, but principally the forces will be transmitted into the chassis and therefore around the vehicle occupants instead of through them.

Figure 3:
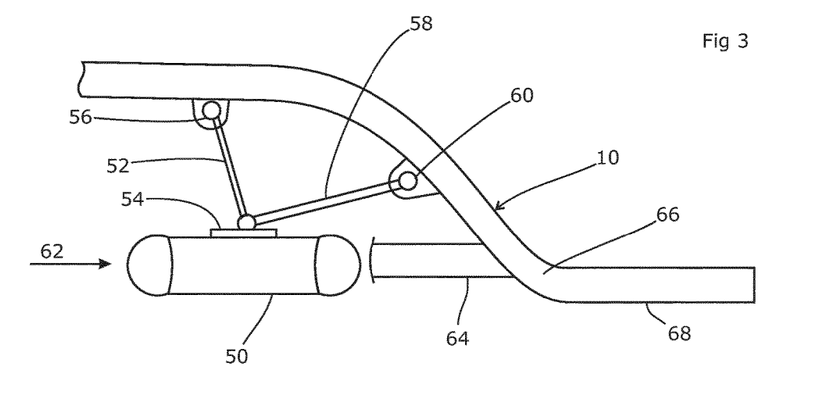
FIG. 3 shows a view from above of a suspension and crush structure of a front wheel of a vehicle according to the present invention.

FIG. 3 shows a schematic view of the front suspension. The front wheel 50 is attached to the chassis framework 10 by suspension arms, which (in this case) consist of a lateral arm 52 which extends inwardly from the hub carrier 54 for the front wheel 50 to a suspension hard point 56, a longitudinal arm 58 which extends rearwardly and slightly inwardly from the hub carrier 54 to a further suspension hard point 60 on the chassis framework 10, and a spring and damper unit (not shown) which extends upwardly from the hub carrier to a hard point on the chassis framework 10. Under a frontal impact along the direction of arrow 62, the longitudinal suspension arm 58 will (eventually) buckle and collapse, leaving the lateral arm 52 to guide the wheel 50. A front tyre catcher 64 is provided to interrupt this motion and allow the impact energy to be absorbed by a combination of collapse of the wheel, crushing of the tyre catcher, and transmission of the forces through the chassis framework and hence around the vehicle occupants.

The frontal section of this chassis framework 10 includes a bend 66 in the chassis rail 68, to allow the rail 68 to pass along the outside of the vehicle in the midsection between the two wheels, and between the front wheels. Thus, the bend 66 allows the rail 68 to divert inwardly so as to sit laterally inboard of the front wheel 50. The rear section of the chassis framework (FIGS. 1 and 2) also has a bend 36 in the (same) chassis rail 68 but in this case the rail 68 deflects upwardly to pass above the rear wheel 12. In both cases, the respective tyre catcher 64, 34 is attached to the chassis rail 68 at the bend 66, 36 so that forces received by the tyre catcher 64, 34 are transmitted into the chassis framework 10. To assist with this, the tyre catchers 64, 34 are generally aligned with the chassis rail 68 behind the bend 66, 36 so as to transfer the forces easily.

Figure 4:
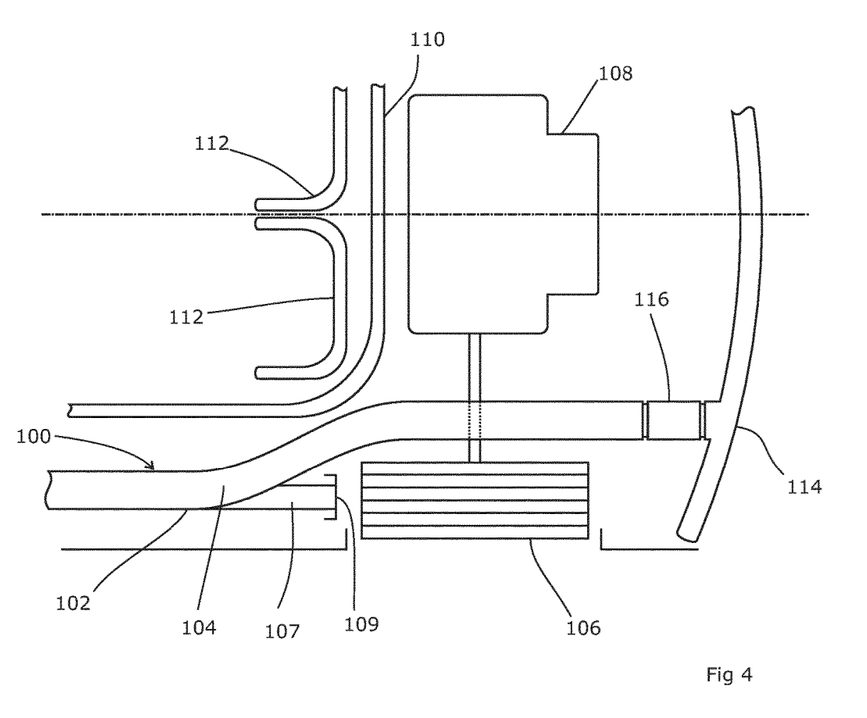
FIG. 4 shows a view from above of an alternative rear chassis and suspension structure according to the present invention.

FIG. 4 shows a further example being a development of the example of FIGS. 1 to 3. The chassis framework 100 includes (as before) a chassis rail 102 that extends longitudinally along the vehicle and deflects inwardly and upwardly at a bend 104 to sit behind and above the rear wheel 106. A tyre catcher 107 extends from the chassis rail 102 at the bend 104, towards the wheel 106. It is aligned to continue in-line with the chassis rail 102 so that impact forces received by the tyre-catcher 107 are transmitted into the chassis framework satisfactorily. It ends with an end-cap 109. An engine 108 sits in the rear section of the chassis, supported by the chassis framework 100 via engine mounts (not shown), behind the passenger cabin 110 with seats 112. The chassis rail 102 ends at the rear of the vehicle where it is connected to a cross-bar 114 via an in-line crushable section 116. The cross-bar 114 extends horizontally across the rear of the vehicle, and is connected on the other side to a corresponding chassis rail (not shown) on the other side of the vehicle via a second crushable section. The crushable sections 116 may comprise a hollow tubular length of a cylindrical or other cross-section, and ideally form distinct sections from the chassis rail 102 so that the can be replaced after being called into service.

In a rear impact, the likely first point of contact (after deformation of body panels and the like) will be with the cross-bar 114. This will absorb some impact energy of itself, with further impact energy being absorbed by the crushable sections 116. Further impact energy is likely to result in contact with the wheels 106, deforming them and absorbing energy as described above. The cross-bar 114 is (in this example) wide enough to contact the wheels if deformed far enough and thus may assist in transferring impact energy into the wheels and thus around the passenger compartment 110, depending on the manner in which it is deformed.

Figure 5:
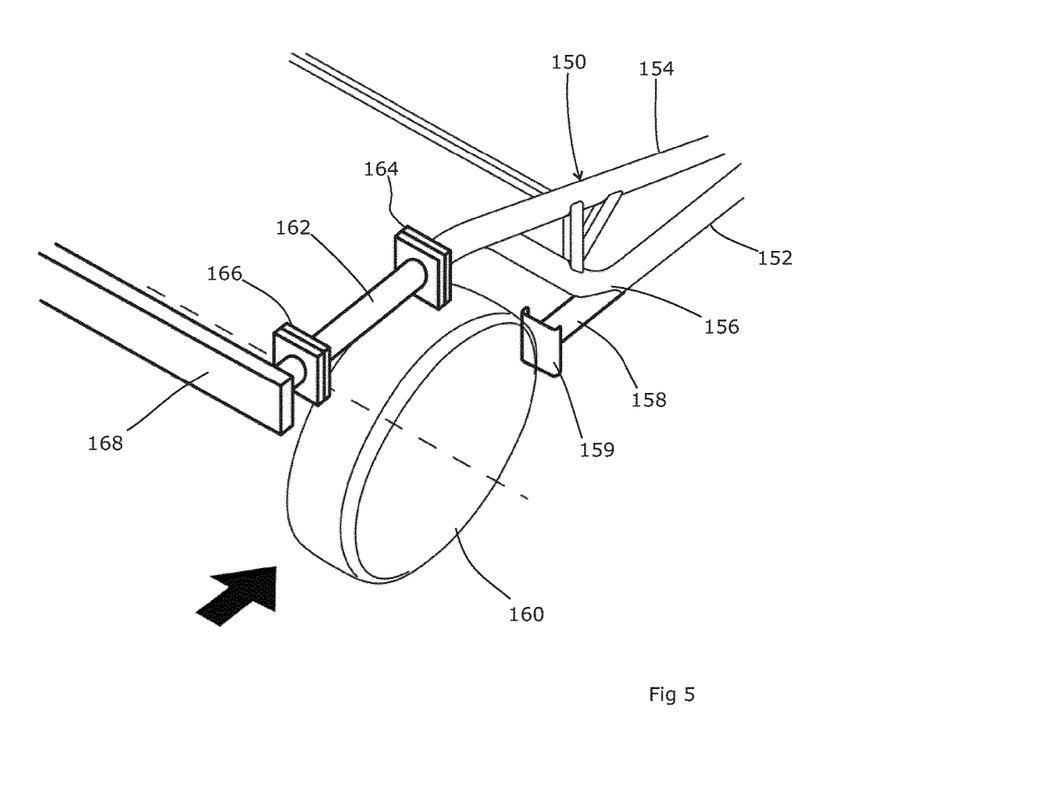
FIG. 5 shows a perspective view of a further alternative rear chassis and suspension structure according to the present invention.
Figure 6:
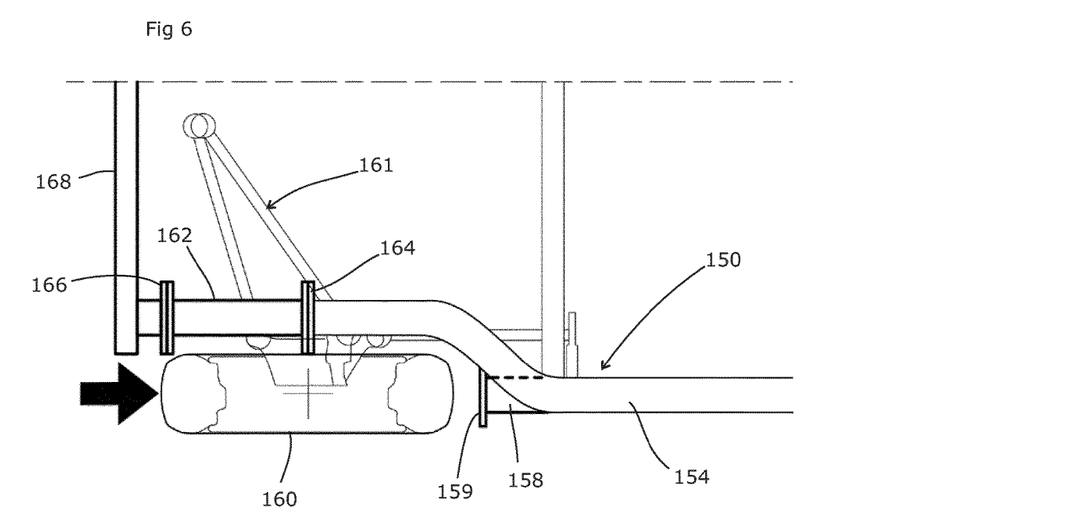
FIGS. 6 and 7 show top and side views (respectively) of the rear chassis and suspension structure of FIG. 5.
Figure 7:
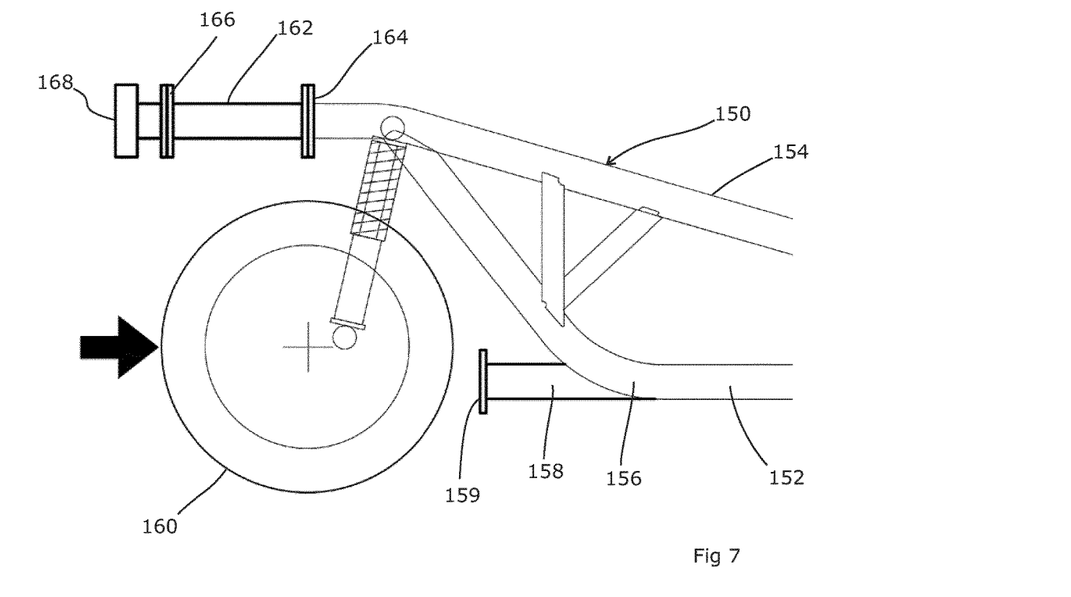

FIGS. 5 to 7 show a further example of the rear section of a vehicle. The chassis framework 150 in this case has two longitudinal chassis rails on either side, a lower rail 152 and an upper rail 154 located generally above the lower rail 152 for at least the major part of its length. At the rear of the car, the lower rail 152 bends upward to meet the upper rail 154, where it is jointed with the upper rail 154. At the bend 156, a crushable tyre catcher 158 is joined to the lower rail 152 and extends rearwardly towards the rear wheel 160, ending with a flat transverse end-plate 159. As before, the tyre catcher is of a crushable nature, formed (in this case) of a circular section hollow cylindrical tube of a controlled diameter and thickness to trigger a controlled linear collapse at a suitable level of impact force. The wheel is supported by a suspension arrangement 161 as shown in FIGS. 1 and 2.

The upper rail 154 extends to a region above and just inboard of the wheel 160, where it is connected to a co-linear crush structure 162 via butt-plates 164 which are bolted together to create a releasable join between the crush structure 162 and the upper rail 154. A similar arrangement of butt-plates 166 at the rear of the crush structure 162 connects it to a cross-bar 168. As with the tyre catcher 158, this is of a circular section hollow cylindrical tube of a controlled diameter and thickness, to trigger a controlled linear collapse at a suitable level of impact force. A similar structure is provided on the opposite side of the car.

In an impact, the cross-bar 168, the wheel 160 and the tyre catcher 158 will react as described above with reference to FIGS. 1 to 4. After an impact which is serious enough to involve the crush structure 162 but not serious enough to deform the chassis framework 150, the butt-plates 164 can be disconnected in order to remove the crush structures 162 and the cross-bar 168 (which is likely to also need replacement) and replace these with new undeformed items.

In this way, the cross-bar 168 & crush structure 162, the wheels 160, the suspension 161, and the tyre catchers 158 act together to absorb the most possible impact energy whilst occupying the minimum necessary space.

Figure 8:
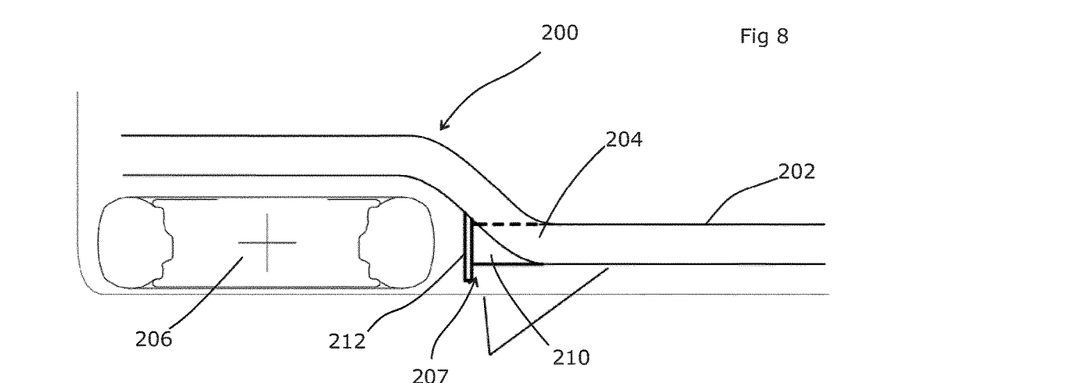
FIG. 8 shows a schematic view from above of a further embodiment.
Figure 9:
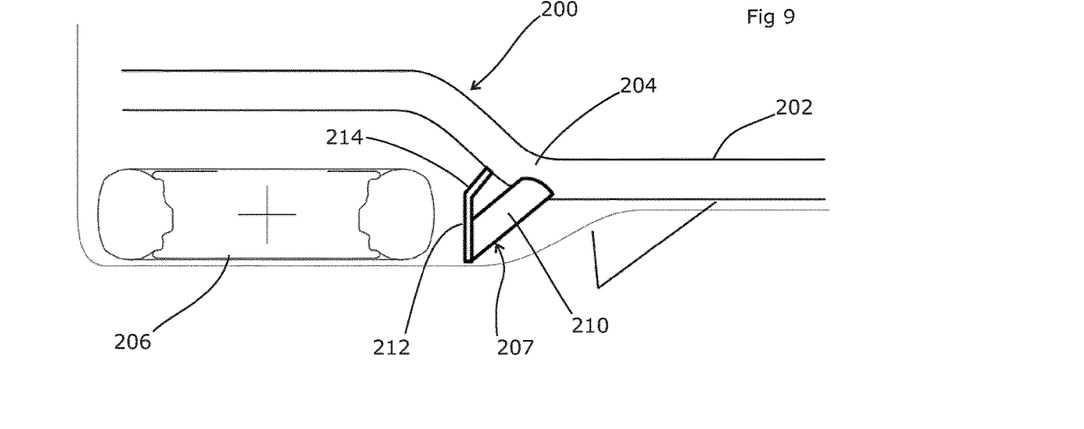
FIG. 9 shows a schematic view from above of a still further embodiment.
Figure 10:
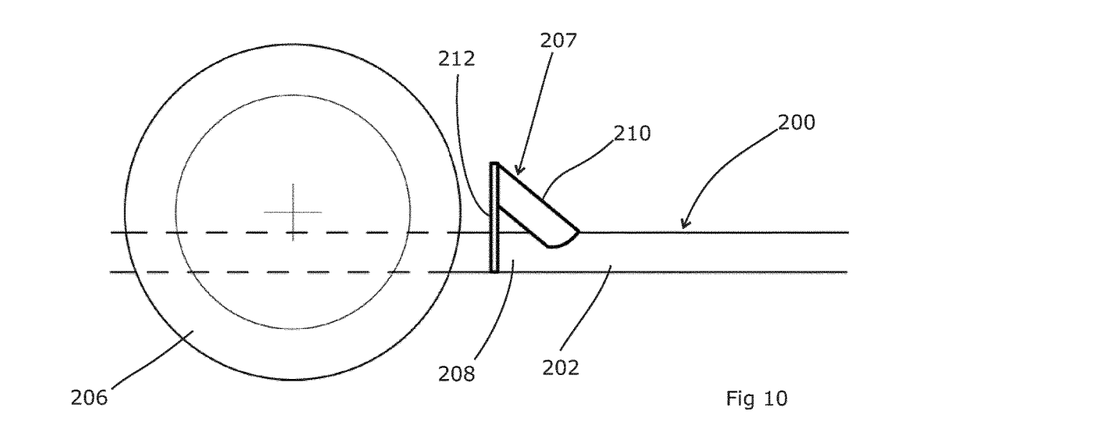
FIG. 10 shows a schematic view form one side of the embodiment of FIG. 9.

FIGS. 8, 9, 10 and 11 show alternative arrangements. The chassis framework 200 again includes a chassis rail 202 which runs longitudinally with respect to the car and which includes a tyre catcher 207, extending from the chassis rail 202 at a point 204 where it bends inwardly to sit behind a rear wheel 206. In all the versions shown in FIGS. 8 to 11, this comprises a pair of tubular members 208, 210, aligned vertically one above the other, and which together define the tyre catcher 207. In FIGS. 8 and 9, being views from above, this means that the lower tubular member 208 is obscured by the upper tubular member 210. The two tubular members 208, 210 are joined to the chassis at substantially the same location 204, from which they diverge. The lower tubular member 208 extends generally and substantially horizontally towards the wheel 206, while the upper tubular member 201 extends at an acute angle upwardly. Both tubular members 208, 210 end at a vertically-aligned point, and a single end cap 212 in the form of a vertical plate is attached to the two ends.

Figure 11:
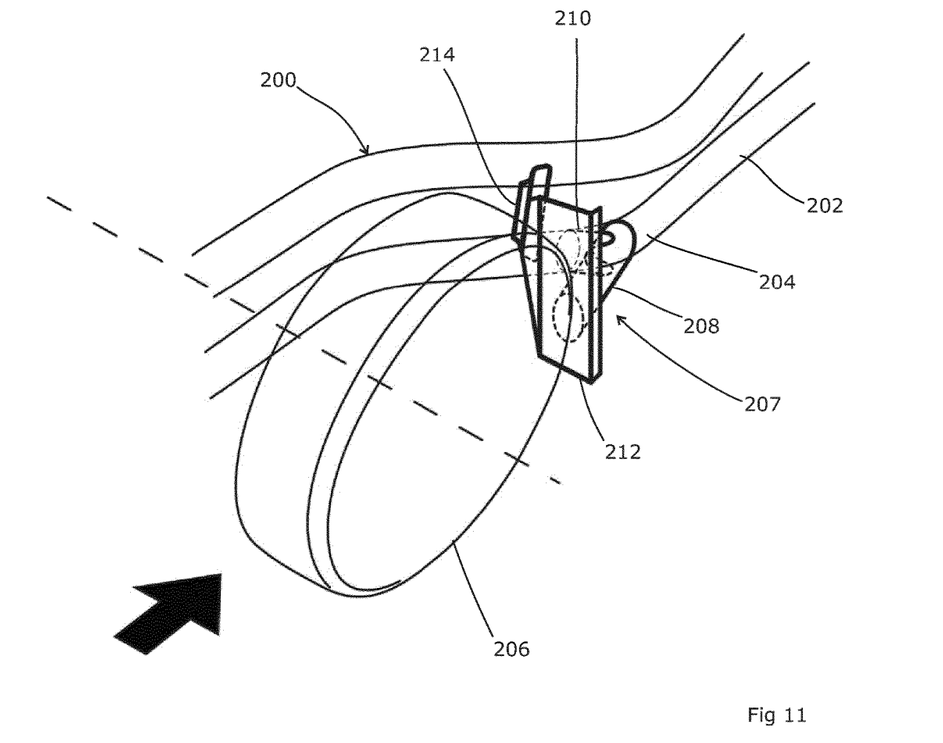
FIG. 11 shows a schematic perspective view of a yet further embodiment.

The embodiments of FIGS. 9 and 11 differ in that the two tubular members 208, 210 are arranged so as to extend outwardly relative to the chassis rail 202. This allows the end points and the end cap 212 to be located correctly relative to a wheel 206 set on a slightly wider track. To provide additional bracing and stability, the end cap 212 in these embodiments includes an inward extension 214 that attaches to the chassis framework 200.

The embodiments of FIGS. 8 to 11 do of course also include suspension and drivetrain components (etc) as illustrated in FIGS. 1 to 7, but which are omitted for clarity. The two tubular members making up the tyre catcher in a V-formation allow a larger vertical area which caters for a wider range of suspension travel, catching the wheel regardless of the current vertical position of the suspension. In combination with the lateral and longitudinal alignment of the tyre catcher so as to meet the wheel as guided by the suspension and drive shaft elements that survive the impact, this ensures that the wheel can assist in absorbing impact forces as described above. Generally, in an impact the power train will move at the same time and thus the drive shafts will play a part in guiding the wheel.

Figure 12:
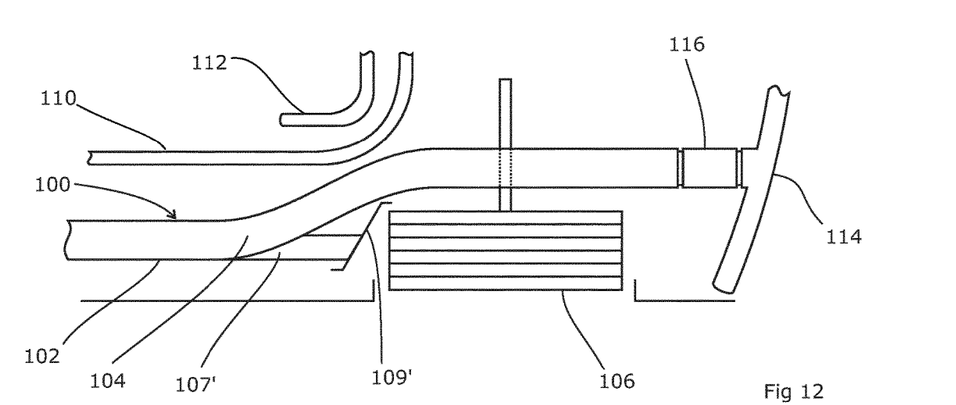
FIG. 12 shows a variant on the embodiment of FIG. 4.

Finally, FIG. 12 shows a variant on the example of FIG. 4. In this variant, the tyre catcher end cap or plate 109' also becomes a deflector. Thus, the end cap 109' is angled, being closer to the vehicle centreline at an edge closer to the wheel, and further from the centreline at an edge more remote from the wheel. As a result, under collision the tyre engages to the plate and is guided/deflected outward relative to the vehicle body. In the case of a rear wheel of an electrically-powered vehicle, this takes the wheel away from the battery storage area, and for an internal-combustion-engine vehicle takes the wheel away from the fuel tank and associated components. This arrangement can also be used on the front tyre catcher, in which case the tyre is deflected away from the cabin, assisting in preventing intrusion into the cabin. Importantly, the impact forces still run down the main longitudinal chassis rail 102 in the same way as the above-described embodiments.

It will of course be understood that many variations may be made to the above-described embodiment without departing from the scope of the present invention. In particular, all of the examples shown can be applied to the front wheel or to the rear wheel or to both. Whilst the examples have been illustrated and described on one side of the car, there will usually be a symmetric arrangement on the other side of the vehicle.

The invention claimed is:

1. A vehicle comprising;
   a chassis,
   at least one wheel, and a hub carrier on which the wheel is mounted,
   a suspension connecting the hub carrier to the chassis, and including a plurality of first links extending from the hub carrier towards a first mounting point on the chassis in at least one of an inward or an upward direction, and at least one second link extending in a longitudinal direction from the hub carrier toward a second mounting point on the chassis, located laterally outboard of the first mounting point;

a crushable structure attached to the chassis at a location aligned with a path of the wheel under impact after collapse of the longitudinally extending link, and wherein at least one longitudinal suspension link is collapsible.

2. The vehicle according to claim 1 in which the chassis includes a framework of interconnected tubular members.

3. The vehicle according to claim 2 in which the chassis further includes planar composite panels bonded to the tubular members.

4. The vehicle according to claim 2, in which the framework includes a laterally-extending crossbar located behind a rearmost extent of the wheel.

5. The vehicle according to claim 2 in which the crushable structure is a tubular member forming part of the framework.

6. The vehicle according to claim 5 in which the crushable structure is substantially co-linear with at least part of a tubular member of the framework extending longitudinally along a majority of the length of the vehicle.

7. The vehicle according to claim 5 in which the framework includes a tubular member extending longitudinally with respect to the vehicle from a point ahead of the wheel to a point behind the wheel, formed with at least one bend ahead of the wheel to define a region ahead of the bend which is laterally aligned with the wheel and a region behind the bend which is located laterally inboard of the wheel, and in which the crushable structure is connected to the tubular member substantially at the bend.

8. The vehicle according to claim 7 in which the crushable structure is substantially co-linear with the region of the tubular member that is ahead of the bend.

9. The vehicle according to claim 1, in which the chassis includes a laterally-extending crossbar located behind a rearmost extent of the wheel.

10. The vehicle according to claim 1 in which the crushable structure is a formed of at least one tubular member.

11. The vehicle according to claim 10 in which the crushable structure comprises a pair of tubular members, aligned vertically one above the other.

12. The vehicle according to claim 11 in which the pair of tubular members are joined to the chassis at substantially the same location, from which they diverge.

13. The vehicle according to claim 12 in which the pair of tubular members are arranged at an acute angle to each other.

14. The vehicle according to claim 11 in which the lower of the two tubular members forming the crushable structure is substantially horizontal.

15. The vehicle according to claim 10 in which the crushable structure includes an end cap on the at least one tubular member, the end cap having a flat outer surface.

16. The vehicle according to claim 1 in which the wheel comprises a hub and a tyre, and the end of the crushable structure proximate the wheel has a convex profile substantially matching a concave outer radial profile of the hub.

17. The vehicle according to claim 1 in which the wheel comprises a hub and a tyre, and the end of the crushable structure proximate the wheel is adapted to pierce the tyre.

18. The vehicle according to claim 1 in which the first links include an upwardly extending link that comprises a spring and damper unit.

19. The vehicle according to claim 1 in which the first links include an inwardly extending link that comprises a wishbone attached to the hub carrier in two locations and attached to the chassis at one location.

20. The vehicle according to claim 19 in which the two locations are spaced horizontally.

* * * * *

UNITED STATES PATENT AND TRADEMARK OFFICE
CERTIFICATE OF CORRECTION

PATENT NO. : 10,315,700 B2
APPLICATION NO. : 15/314856
DATED : June 11, 2019
INVENTOR(S) : Frank Coppuck

Page 1 of 1

It is certified that error appears in the above-identified patent and that said Letters Patent is hereby corrected as shown below:

On the Title Page

Item (56), In the References Cited, page 2, Column 2:
Please delete "WO WO 2005118374 A1 * 12/2005 ...... B62D 21/155"
And insert -- WO 2005118374 A1 * 12/2005 ...... B62D 21/155 --

Signed and Sealed this
Eleventh Day of February, 2020

Andrei Iancu
*Director of the United States Patent and Trademark Office*